Nov. 8, 1949  G. J. SCOLES  2,487,603

CIRCUITS FOR COMPARING ELECTRICAL QUANTITIES

Filed April 11, 1947

Inventor:
Graham J. Scoles,
by Harry E. Dunham
His Attorney.

Patented Nov. 8, 1949

2,487,603

UNITED STATES PATENT OFFICE 2,487,603

CIRCUITS FOR COMPARING ELECTRICAL QUANTITIES

Graham J. Scoles, East Sheen, London, England, assignor to General Electric Company, a corporation of New York Application April 11, 1947, Serial No. 740,824
In Great Britain May 2, 1946

10 Claims. (Cl. 250—27)

1

This invention relates to circuits for comparing electrical quantities such as voltages. More particularly it is concerned with thermionic valve circuit arrangements for indicating a resultant of such quantities such as the difference between or the sum of two potentials independently of their absolute values. Examples of its application are to biological amplifiers, electronic calculating machines and transient voltages.

According to one aspect of the invention, the potentials to be compared may be applied respectively to the input terminals of a pair of thermionic amplifiers from which an output voltage is obtained which is the mean (or proportional to the mean value) of a pair of derived output voltages whereof the first derived voltage is in the same sense as and a function of the first of said input potentials and the second derived voltage is in the reverse sense to and a similar function of the second of said input potentials.

Preferably a second output voltage is derived which is composed of the same derived output voltages as the first but with their senses reversed so that the second output voltage is equal in magnitude to the first but of opposite sign, and the two output voltages together provide a push-pull output.

According to another aspect of the invention the input potentials to be compared are applied to the respective input grids of a pair of thermionic valves and output voltages derived from the respective valves are applied to opposite ends of a potential dividing circuit, one of said derived voltages being in the same sense as its associated input and the other derived voltage being in the reverse sense to its associated input whereby from an intermediate point of the potential divider there is obtained a voltage which is a function of the difference between the two input potentials.

Figure 1:
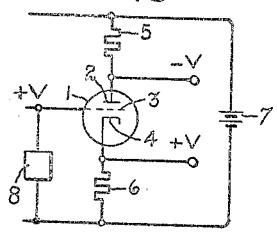
Figure 4:
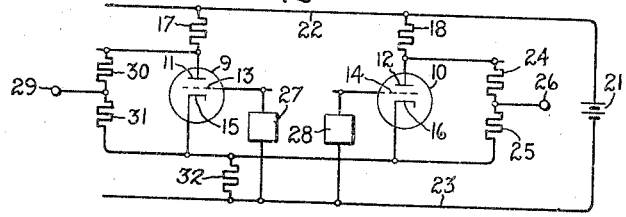
Figure 5:
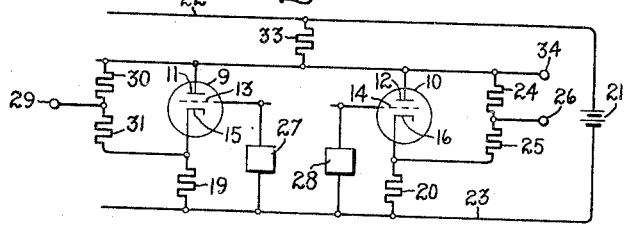
Figure 6:
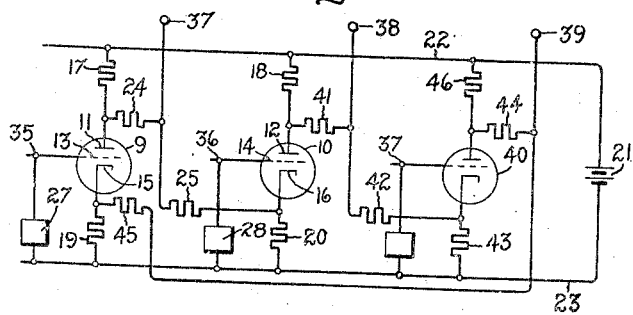

In order that the invention may be more clearly understood reference will now be made to the accompanying drawing, in which:

Fig. 1 shows a phase-splitting circuit which is employed in carrying out the invention, Figs. 2 to 5 show various embodiments of the invention for obtaining the difference between two potentials, while Fig. 6 shows an extended circuit for obtaining the difference between any pair of three input potentials.

In the phase-splitting circuit shown in Fig. 1, a thermionic discharge device such as a vacuum triode 1, having an anode 2, a grid 3 and a cathode 4, has an impedance such as a resistance 5 in

2 the anode circuit and an equal impedance such as resistance 6 in the cathode circuit. Any suitable means such as a battery 7 may be employed for establishing a circuit energizing potential between cathode 4 and anode 2. With such an arrangement, an input voltage applied between the cathode 4 and the grid 3 of the device will produce a voltage change in the reverse sense to the input voltage at the anode 2, i. e. across resistance 5, and a voltage change in the same sense as the input voltage at the cathode 4, i. e. across resistance 6. For example, assuming that the stage gain of the device is unity, an input voltage $+v$ applied to the control grid by any suitable means, such as source 8, will produce an output voltage change $-v$ at the anode and a voltage change $+v$ at the cathode. Since these voltage changes are substantially equal and opposite they may be regarded as being in push-pull.

Figure 2:
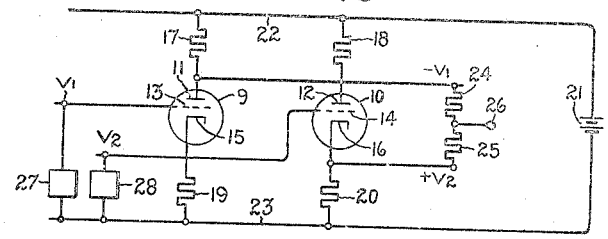

Fig. 2 shows how the phase-splitting circuit is utilized in carrying out the invention. In this case, there are two phase-splitting discharge devices such as vacuum triodes 9 and 10 having respectively anodes 11 and 12, grids 13 and 14, cathodes 15 and 16, resistances 17 and 18 in their respective anode circuits and resistance 19 and 20 in their respective cathode circuits. As in Fig. 1, any suitable means such as a battery 21 may be employed for establishing a circuit energizing potential between the lines 22 and 23 connected to the anodes and cathodes respectively. For purposes of explanation it will be assumed that the two devices have identical characteristics, that each has a stage gain of unity and that the resistances 17, 18, 19, and 20 are all equal. A voltage dividing circuit may be formed by a pair of equal impedances such as resistors 24 and 25 connected in series with each other between the anode 11 of triode 9 and the cathode 16 of triode 10, the midpoint of the voltage dividing circuit being connected to an output terminal 26. For purposes of explanation it is assumed that the resistances 24 and 25 are large in comparison with resistances 17 through 20. From the explanation of Fig. 1, it will be clear that an input voltage $+v_1$ applied to the grid 13 of triode 9 by any suitable means such as source 27 will produce a derived voltage $-v_1$ at the anode 11 and a derived voltage $+v_1$ at the cathode 15, so that at the terminal 26 there will be produced a component of output voltage $$-\frac{v_1}{2}$$

between the terminal 26 and a fixed point in the circuit such as line 23. If in addition, an input voltage $+v_2$ is applied to the grid 14 of triode 10 by any suitable means such as source 28, input voltage $+v_2$ will similarly produce a derived voltage $-v_2$ at the anode 12 of triode 10 and a derived voltage $+v_2$ at the cathode 16 thereby producing a second component of output voltage $$\frac{+v_2}{2}$$

at terminal 26. Since the output terminal 26 is the midpoint of the voltage dividing circuit it is clear that there will be produced at this point a voltage $$\frac{v_2-v_1}{2}$$

This is clearly proportional to the difference between the two input potentials $+v_1$ and $+v_2$; it however vanishes if $v_1=v_2$. It will be clear that the output obtained in this manner is solely proportional to the difference between the two voltages and is not in any way affected by external influences producing equal and similar changes in the two voltages. Thus, such a circuit could be used for a biological amplifier to measure minute voltage changes between different points on the subject irrespective of the presence of relatively large voltage changes of the subject as a whole such as might occur due to the presence of other nearby electrical circuits.

Figure 3:
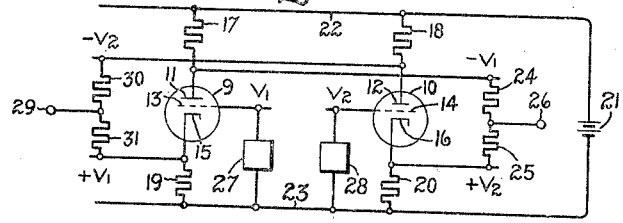

In Fig. 2 it is assumed that the output is taken between the output terminal 26 of the potential divider and a fixed point in the circuit such as line 23. In Fig. 3 there is an output terminal 26 corresponding to that of Fig. 2, while a second output terminal 29 is obtained by connecting a similar potential dividing circuit comprising equal resistors 30 and 31 between the anode 12 of triode 10 and the cathode 15 of triode 9. Otherwise the circuit of Fig. 3 is the same as that of Fig. 2 for which reason like elements have been assigned like numerals. With this arrangement a voltage $$\frac{v_2-v_1}{2}$$

is obtained as before at terminal 26 while at the upper end of the resistor 30 there will be produced a voltage $-v_2$ and a voltage $+v_1$ at the lower end of resistor 31 giving a voltage at terminal 29 equal to $$\frac{v_1-v_2}{2}$$

Thus the voltage difference between the terminals 26 and 29 is $v_1-v_2$. With such an arrangement the output voltage produced at terminals 26 and 29 are equal in value but opposite in sign, that is, they are in push-pull.

The circuit of Fig. 4 is derived from Fig. 3 and again like numerals have been used to designate corresponding elements. In this arrangement the cathodes 15 and 16 are electrically common and the two cathode resistors 19 and 20 are replaced by a common cathode resistor 32 which may have a value half that of the individual resistors 19 and 20. If the two grids 13 and 14 are driven in phase by equivalent input voltages the voltages produced at terminals 29 and 26 will be equal and there will be no output between them. If the two grids are driven in push-pull there is no negative feed-back on the common cathode resistor as the signals due to the two driving voltages cancel at the cathodes so the full gains of the triodes are obtained at the anodes and half of this voltage appears at each of the two output terminals 26 and 29 in reversed direction or push-pull as before.

For example if the stage gain of each triode is M and $+v$ is the input voltage on grid 13 and $-v$ that on grid 14, the output at terminal 26 is $$\frac{-Mv}{2}$$

and at terminal 29 is $$+\frac{Mv}{2}$$

so the difference between terminals 29 and 26 is $Mv$. Thus the full stage gain of the triodes is obtained as compared with the Fig. 2 arrangement where the output is half the input.

In the case where only one grid is driven, the cathode potential alters by half so that assuming $+v$ is applied to the grid 13 of triode 9 in Fig. 4 the cathodes alter by $$+\frac{v}{2}$$

In this case the output at terminal 29 is $$\frac{1}{2}\left(-\frac{Mv}{2}+\frac{v}{2}\right) \text{ or } \frac{-v}{4}(M-1)$$

while the output at terminal 26 is given by $$\frac{1}{2}\left(\frac{Mv}{2}+\frac{v}{2}\right) \text{ or } \frac{v}{4}(M+1)$$

The difference between terminals 29 and 26 is hence $$\frac{Mv}{2}$$

It will be seen that the two outputs do not quite balance but as M is usually large the out-of-balance is negligible, and in any case does not affect the accuracy of the subtraction.

Fig. 5 is a modification of Fig. 3 in which instead of a common cathode resistor as in Fig. 4 there is a common anode resistor 33 of half the value of individual resistors 17 and 18. As in the Fig. 4 arrangement, the voltage between the output terminals 26 and 29 provides an indication of the difference between the input potentials. This arrangement, however, differs in that at the terminal 34 a voltage is derived which is a function of the sum of the input voltages. It is desirable in this case that the impedances of the discharge devices should be large compared with the resistance of resistor 33.

The arrangements of Figs. 2 to 5 have shown how two potentials may be subtracted. These arrangements can, however, be extended to provide an indication of the difference between any two of a number of potentials and Fig. 6 shows an arrangement in which an indication may be obtained of the difference between any pair of three input voltages applied to terminals 35, 36, and 37 by observing the voltage difference between the corresponding output terminals 37, 38, or 39 and line 23.

It will be appreciated that Fig. 6 is the arrangement of Fig. 2 extended to three triodes and like numerals have been used to designate like parts as regards the first two triodes. The second triode is connected to the third triode 40, by resistors 41, 42, and 43 which perform the same function as their counterparts 24, 25, 20, between the first two triodes. Similarly, the third triode 40 is connected back to the first triode 9 by resistors 44, 45, and 19, the resistor 46 performing a function corresponding to those of resistors 17 and 18. Obviously additional dividing networks may be added to provide push-pull operation, for instance, so as to obtain the arrangement of Fig. 3 extended to three valves.

In the arrangements of Figs. 3 to 5 the output voltage may be obtained by connecting a measuring instrument either between the output terminals 26 and 29 or where only one grid is driven between the terminal 26 and a fixed point in the circuit such as line 23. Obviously in all cases additional amplifying apparatus may be interposed between the output terminals and the indicating instrument.

If the anode and cathode resistors are equal and the triodes identical the output terminal would normally be taken from the mid-point of the potential divider. If the resistors or triodes are not similar the tapping point would normally be adjusted to compensate for these inequalities and in such cases the potentiometers might have adjustable, that is, sliding, tapping points. In some cases the voltage difference may be measured by the position to which the potentiometers are set to obtain a balance.

The invention is applicable to the measurement of both direct and alternating potentials.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A circuit for comparing a plurality of electrical quantities, comprising a plurality of electrical discharge devices each having a cathode, a control grid, and an anode, an impedance in series with each of said cathodes, an impedance in series with each of said anodes, and means for applying respective ones of said quantities to each of said grids whereby voltages across said impedances responsive and proportional to the one of said quantities applied to the respective grid may be derived, and potential divider means interconnecting said anodes and said cathodes for deriving electrical voltages which are measures of resultants of said quantities.

2. A circuit as in claim 1 in which all of said impedances are resistors.

3. A circuit for comparing two voltages, comprising a first electrical discharge device having a cathode, a control grid, and an anode, a resistor in series with said cathode, a resistor in series with said anode, and means for applying one of said voltages to said grid whereby voltages across said resistors responsive and proportional to said voltage may be derived, a second electrical discharge device having a cathode, a control grid, and an anode, a resistor in series with said cathode, a resistor in series with said anode, and means for applying a second of said voltages to said second mentioned grid whereby voltages across said second mentioned resistors responsive and proportional to said second voltage may be derived, and potential divider means connected to said anodes and said cathodes for deriving an electrical voltage which is a measure of a resultant of said voltages.

4. A circuit for comparing a plurality of electrical quantities, comprising a plurality of electrical discharge devices each having a cathode, a control grid and an anode, an impedance in series with each of said cathodes, an impedance in series with each of said anodes, and means for applying respective ones of said quantities to each of said grids whereby voltages across said impedances responsive and proportional to the said quantity applied to the respective grid may be derived, and potential divider means interconnecting said anodes and said cathodes for deriving electrical voltages which are measures of resultants of said quantities, said potential divider means comprising a plurality of impedances each connected between the anode of one discharge device and the cathode of another and having contact points intermediate the ends thereof between which said last mentioned electrical voltages may be derived.

5. A circuit as in claim 4 in which the impedances in series with said anodes and cathodes are very small compared to the impedances comprising said potential divider means.

6. A circuit as in claim 4 in which all of said impedances are resistors.

7. A circuit for comparing two electrical quantities, comprising a first electrical discharge device having a cathode, a control grid, and an anode, an impedance in series with said cathode, an impedance in series with said anode, and means for applying one of said quantities to said grid whereby voltages across said impedances responsive and proportional to said quantity may be derived, a second electrical discharge device having a cathode, a control grid, and an anode, an impedance in series with said cathode and an impedance in series with said anode, and means for applying a second of said quantities to said second mentioned grid whereby voltages across said second mentioned impedances responsive and proportional to said second quantity may be derived, and potential divider means connected to said anodes and said cathodes for deriving an electrical voltage which is a measure of a resultant of said quantities, said potential divider comprising an impedance connected between said first cathode and said second anode and having a contact point intermediate the ends thereof, and an impedance connected between said first anode and said second cathode and having a contact point intermediate the ends thereof.

8. A circuit as in claim 7 in which the impedances in series with said anodes and cathodes are very small compared to the impedance comprising said potential divider means.

9. A circuit as in claim 7 in which all said impedances are resistors.

10. A circuit as in claim 1 in which all of said impedances are resistors of equal value.

GRAHAM J. SCOLES.

REFERENCES CITED

The following references are of record in the file of this patent:

UNITED STATES PATENTS

| Number | Name | Date |
| --- | --- | --- |
| 2,271,876 | Seeley | Feb. 3, 1942 |
| 2,390,824 | Berry | Dec. 11, 1945 |
| 2,431,832 | Schlesinger | Dec. 2, 1947 |